(12) United States Patent
Xiao

(10) Patent No.: US 11,982,913 B2
(45) Date of Patent: May 14, 2024

(54) LIQUID CRYSTAL DISPLAY PANEL AND LIQUID CRYSTAL DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventor: Bangqing Xiao, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 419 days.

(21) Appl. No.: 17/252,108

(22) PCT Filed: Oct. 29, 2020

(86) PCT No.: PCT/CN2020/124613
§ 371 (c)(1),
(2) Date: Dec. 14, 2020

(87) PCT Pub. No.: WO2022/032881
PCT Pub. Date: Feb. 17, 2022

(65) Prior Publication Data
US 2022/0317492 A1 Oct. 6, 2022

(30) Foreign Application Priority Data
Aug. 10, 2020 (CN) .......................... 202010796581.X

(51) Int. Cl.
*G02F 1/1368* (2006.01)
*G02F 1/1362* (2006.01)

(52) U.S. Cl.
CPC ...... *G02F 1/1368* (2013.01); *G02F 1/136286* (2013.01)

(58) Field of Classification Search
CPC .................................................... G02F 1/1368
See application file for complete search history.

(56) References Cited

U.S. PATENT DOCUMENTS

2006/0033853 A1* 2/2006 Lee ................... G02F 1/133707
349/42
2009/0262288 A1* 10/2009 Tsuchiya ........... G02F 1/133555
349/114

(Continued)

FOREIGN PATENT DOCUMENTS

| CN | 1740883 A | 3/2006 |
|---|---|---|
| CN | 101013239 A | 8/2007 |

(Continued)

OTHER PUBLICATIONS

International Search Report in International application No. PCT/CN2020/124613, dated May 13, 2021.

(Continued)

*Primary Examiner* — Sang V Nguyen
(74) *Attorney, Agent, or Firm* — PV IP PC; Wei Te Chung; Zhigang Ma

(57) ABSTRACT

Embodiments of the present application provides a liquid crystal display panel and a liquid crystal display device, wherein by setting a shape of sub-pixels to a square and the shape of a pixel electrode to a circle, and by dividing the pixel electrode into a plurality of sub-pixel electrodes through a first slit, a second slit, and the plurality of third slits, a number of the direction of liquid crystal is increased when there are more than four domains in the sub-pixels. When viewing at different viewing angles, the number of liquid crystals in the same direction decrease, so that a (Continued)

brightness of the liquid crystal display panel is reduced, thereby alleviating the color-shift problem.

20 Claims, 5 Drawing Sheets

(56) References Cited

U.S. PATENT DOCUMENTS

| | | | | |
|---|---|---|---|---|
| 2010/0053518 | A1* | 3/2010 | Jeong | G02F 1/133555 |
| | | | | 349/114 |
| 2011/0037932 | A1* | 2/2011 | Takahashi | G02F 1/133707 |
| | | | | 349/129 |
| 2012/0206683 | A1* | 8/2012 | Zhang | G02F 1/1343 |
| | | | | 349/139 |
| 2013/0003004 | A1 | 1/2013 | Shimizu | |
| 2019/0011784 | A1* | 1/2019 | Chen | G02F 1/133528 |

FOREIGN PATENT DOCUMENTS

| | | |
|---|---|---|
| CN | 101144952 A | 3/2008 |
| CN | 100514614 C | 7/2009 |
| CN | 101995706 A | 3/2011 |
| CN | 102062979 A | 5/2011 |
| CN | 104155816 A | 11/2014 |
| CN | 204496141 U | 7/2015 |
| CN | 106873258 A | 6/2017 |
| CN | 107450243 A | 12/2017 |
| CN | 207742440 U | 8/2018 |
| CN | 109683406 A | 4/2019 |

OTHER PUBLICATIONS

Written Opinion of the International Searching Authority in International application No. PCT/CN2020/124613, dated May 13, 2021.

Chinese Office Action issued in corresponding Chinese Patent Application No. 202010796581.X dated Apr. 2, 2021, pp. 1-9.

* cited by examiner

LIQUID CRYSTAL DISPLAY PANEL AND LIQUID CRYSTAL DISPLAY DEVICE

RELATED APPLICATIONS

This application is a Notional Phase of PCT Patent Application No. PCT/CN2020/124613 having international filing date of Oct. 29, 2020, which claims the benefit of priority of Chinese Patent Application No. 202010796581.X filed on Aug. 10, 2020. The contents of the above applications are all incorporated by reference as if fully set forth herein in their entirety.

BACKGROUND

Field of Invention

The present disclosure relates to the technical field of display technology, and particularly to a liquid crystal display panel and a liquid crystal display device.

Description of Prior Art

In existing liquid crystal display technologies, vertical alignment technology is used to achieve wide viewing angles, and the viewing angles are increased by dividing sub-pixels into a plurality of domains. When existing sub-pixels adopt a four-domain design, images at a wide viewing angle may become white and a color-shifting problem associated with large viewing angles would occur. When sub-pixels adopt an eight-domain design, since the eight-domain design needs to be controlled using three thin film transistors, aperture ratios are lowered.

Therefore, existing vertical alignment type liquid crystal display (LCD) devices have the technical problem of color shifting at large viewing angles.

SUMMARY

To solve the above problems, the present application provides the following technical solutions.

Embodiments of the present application provide a liquid crystal display panel comprising a plurality of sub-pixels, wherein each of the plurality of sub-pixels comprises a pixel electrode and a thin film transistor (TFT), the sub-pixel is a circle and the pixel electrode is circular, and the TFT is arranged on each side of the circle formed by the sub-pixel and is connected to the pixel electrode through a signal line;

wherein the pixel electrode is divided into a plurality of sub-pixel electrodes by a plurality of slits, and the plurality of slits comprise a first slit, a second slit that pass through the center of the pixel electrode and are perpendicular to each other and a plurality of third slits; and wherein the first slit and the second slit divide the pixel electrode into a first quadrant area, a second quadrant area, a third quadrant area, and a fourth quadrant area that are arranged counterclockwise, and the plurality of third slits are evenly arranged in at least one of the first quadrant area, the second quadrant area, the third quadrant area and the fourth quadrant area.

In some embodiments, the plurality of third slits comprises a fourth slit and a fifth slit, the fourth slit is located in the first quadrant area, the fifth slit is located in the third quadrant area, center lines of the fourth slit and the fifth slit are on the same straight line and pass through an overlapping area, and the fourth slit and the fifth slit are not in contact with the overlapping area.

In some embodiments, the fourth slit and the fifth slit respectively comprise a slit, the fourth slit divides the pixel electrode in the first quadrant area into two sub-pixel electrodes, and the fifth slit divides the pixel electrode in the third quadrant area into two sub-pixel electrodes.

In some embodiments, the fourth slit and the fifth slit respectively comprise three slits, the fourth slit divides the pixel electrode in the first quadrant area into four sub-pixel electrodes, and the fifth slit divides the pixel electrode in the third quadrant area into four sub-pixel electrodes.

In some embodiments, the plurality of third slits further comprises a sixth slit and a seventh slit, the sixth slit is located in the second quadrant area, and the seventh slit is located in the fourth quadrant area, center lines of the sixth slit and the seventh slit are on the same straight line and pass through an overlapping area, and the sixth slit and the seven slit are not in contact with the overlapping area.

In some embodiments, the sixth slit and the seventh slit each respective comprise a slit, the sixth slit divides the pixel electrode in the second quadrant area into two sub-pixel electrodes, and the seventh slit divides the pixel electrode in the fourth quadrant area into two sub-pixel electrodes.

In some embodiments, the sixth slit and the seventh slit respectively comprise three slits, and the sixth slit divides the pixel electrode in the second quadrant area into four sub-pixel electrodes, and the seventh slit divides the pixel electrode in the fourth quadrant area into four sub-pixel electrodes.

In some embodiments, the third slit comprises a fourth slit and a fifth slit, the fourth slit is located in the first quadrant area, and the fifth slit is located in the third quadrant area, and an overlapping area formed by the fourth slit and the fifth slit is the same as the overlapping area formed by the first slit and the second slit.

In some embodiments, the third slit further comprises a sixth slit and a seventh slit, the sixth slit is located in the second quadrant area, the seventh slit is located in the fourth quadrant area, and an overlapping area formed by the sixth slit and the seventh slit is the same as the overlapping area formed by the first slit and the second slit.

In some embodiments, the first slit, the second slit, the fourth slit, the fifth slit, the sixth slit, and the seventh slits have the same length and the same width, respectively.

In some embodiments, a distance between the first slit and the edge of a circle formed by the pixel electrode is equal to one-tenth to one-fifth of a diameter of the pixel electrode.

Meanwhile, embodiments of the present application further provides a liquid crystal display device comprising a liquid crystal display panel and a backlight module, wherein the liquid crystal display panel comprising a plurality of sub-pixels, each of the plurality of sub-pixels comprises a pixel electrode and a thin film transistor (TFT), the sub-pixel is a circle and the pixel electrode is circular, and the TFT is arranged on each side of the circle formed by the sub-pixel and is connected to the pixel electrode through a signal line;

wherein the pixel electrode is divided into a plurality of sub-pixel electrodes by a plurality of slits, and the plurality of slits comprise a first slit, a second slit that pass through the center of the pixel electrode and are perpendicular to each other and a plurality of third slits; and wherein the first slit and the second slit divide the pixel electrode into a first quadrant area, a second quadrant area, a third quadrant area, and a fourth quadrant area that are arranged counterclockwise, and the plurality of third slits are evenly arranged in at least one of the first quadrant area, the second quadrant area, the third quadrant area and the fourth quadrant area.

In some embodiments, the plurality of third slits comprises a fourth slit and a fifth slit, the fourth slit is located in the first quadrant area, the fifth slit is located in the third quadrant area, center lines of the fourth slit and the fifth slit are on the same straight line and pass through an overlapping area, and the fourth slit and the fifth slit are not in contact with the overlapping area.

In some embodiments, the fourth slit and the fifth slit respectively comprise a slit, the fourth slit divides the pixel electrode in the first quadrant area into two sub-pixel electrodes, and the fifth slit divides the pixel electrode in the third quadrant area into two sub-pixel electrodes.

In some embodiments, the fourth slit and the fifth slit respectively comprise three slits, the fourth slit divides the pixel electrode in the first quadrant area into four sub-pixel electrodes, and the fifth slit divides the pixel electrode in the third quadrant area into four sub-pixel electrodes.

In some embodiments, the plurality of third slits further comprises a sixth slit and a seventh slit, the sixth slit is located in the second quadrant area, and the seventh slit is located in the fourth quadrant area, center lines of the sixth slit and the seventh slit are on the same straight line and pass through an overlapping area, and the sixth slit and the seven slit are not in contact with the overlapping area.

In some embodiments, the sixth slit and the seventh slit each respective comprise a slit, the sixth slit divides the pixel electrode in the second quadrant area into two sub-pixel electrodes, and the seventh slit divides the pixel electrode in the fourth quadrant area into two sub-pixel electrodes.

In some embodiments, the sixth slit and the seventh slit respectively comprise three slits, and the sixth slit divides the pixel electrode in the second quadrant area into four sub-pixel electrodes, and the seventh slit divides the pixel electrode in the fourth quadrant area into four sub-pixel electrodes.

In some embodiments, the third slit comprises a fourth slit and a fifth slit, the fourth slit is located in the first quadrant area, and the fifth slit is located in the third quadrant area, and an overlapping area formed by the fourth slit and the fifth slit is the same as the overlapping area formed by the first slit and the second slit.

In some embodiments, the third slit further comprises a sixth slit and a seventh slit, the sixth slit is located in the second quadrant area, the seventh slit is located in the fourth quadrant area, and an overlapping area formed by the sixth slit and the seventh slit is the same as the overlapping area formed by the first slit and the second slit.

Embodiments of the present application provides a liquid crystal display panel and a liquid crystal display device, and the liquid crystal display panel comprises a plurality of sub-pixels, wherein each of the plurality of sub-pixels comprises a pixel electrode and a thin film transistor (TFT), the sub-pixel is a circle and the pixel electrode is circular, and the TFT is arranged on each side of the circle formed by the sub-pixel and is connected to the pixel electrode through a signal line; wherein the pixel electrode is divided into a plurality of sub-pixel electrodes by a plurality of slits, and the plurality of slits comprise a first slit, a second slit that pass through the center of the pixel electrode and are perpendicular to each other and a plurality of third slits; and wherein the first slit and the second slit divide the pixel electrode into a first quadrant area, a second quadrant area, a third quadrant area, and a fourth quadrant area that are arranged counterclockwise, and the plurality of third slits are evenly arranged in at least one of the first quadrant area, the second quadrant area, the third quadrant area and the fourth quadrant area. By setting the shape of the sub-pixels to a square and the shape of the pixel electrode to a circle, the thin film transistor can be arranged on the side of the square, so as to make full use of the space. The pixel electrode is divided into a plurality of sub-pixel electrodes through the first slit, the second slit, and the plurality of third slits, so that there are more than four domains exits in the sub-pixels, and the number of the direction of the liquid crystal are increased. When viewing at different viewing angles, the number of liquid crystals in the same direction decreases when viewing so that a brightness of the liquid crystal display panel is reduced, thereby alleviating the color-shift problem, and resolving the technical problem of color-shift at large viewing angle in the existing vertical alignment type liquid crystal display device.

DETAILED DESCRIPTION OF EMBODIMENTS

The present application provides a liquid crystal display panel and a liquid crystal display device. In order to make the objects, technical solutions, and effects of the present application more accurate and clearer, the present application will be further described in detail below with reference to the accompanying drawings and embodiments. It should be understood that the specific embodiments described here are only used to explain the application, and not used to limit the application.

Embodiments of the present application address the technical problem of a large color-shift of existing vertical alignment type liquid crystal display devices, and the embodiments of the present application are used to solve this problem.

Figure 1:
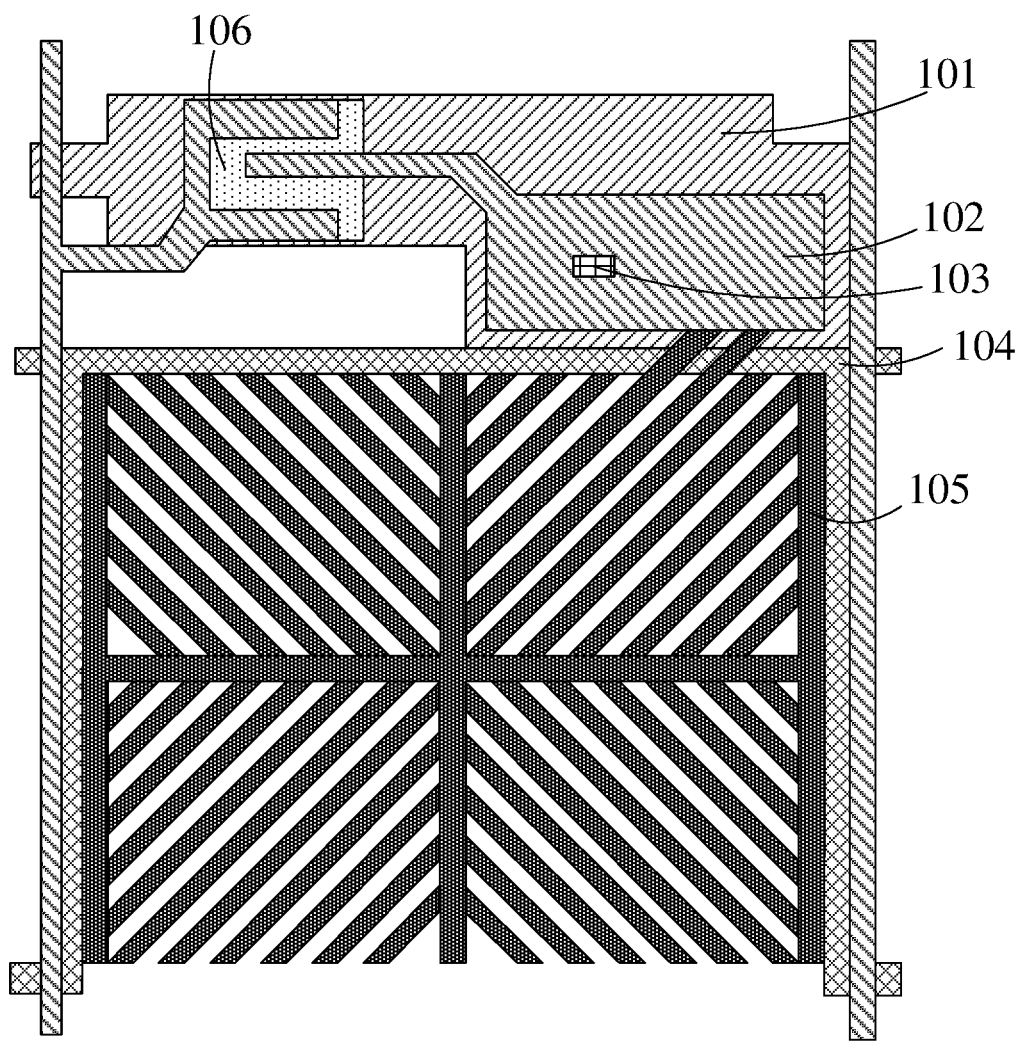
FIG. 1 is a schematic diagram of a conventional liquid crystal display panel with a four-domain design.
Figure 2:
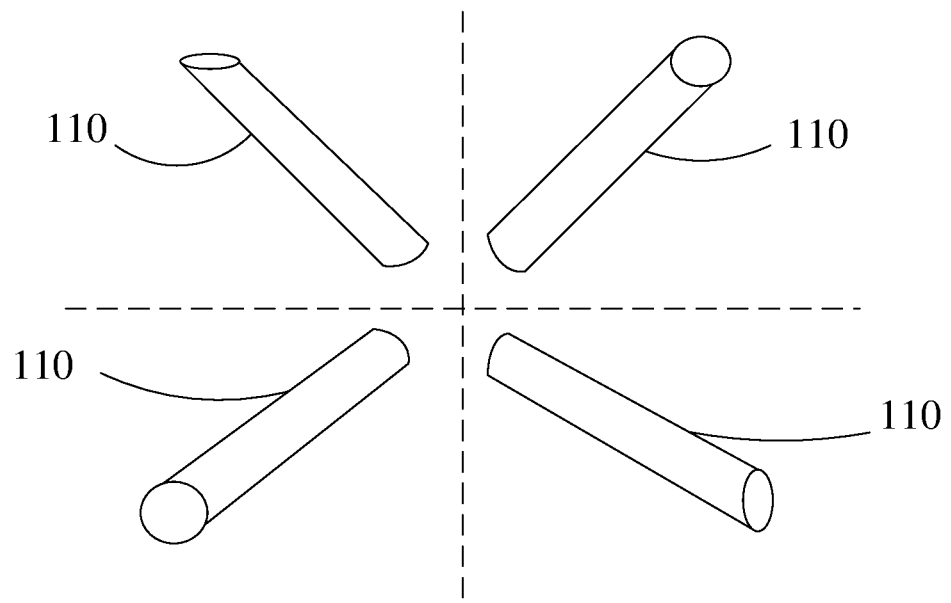
FIG. 2 is a schematic diagram of an arrangement direction of liquid crystals in a liquid crystal display panel with a conventional four-domain design.

As shown in FIG. 1, an existing liquid crystal display device with a four-domain sub-pixel design comprises a gate layer 101, a source/drain layer 102, an insulating layer 103, a common electrode layer 104, a pixel electrode layer 105, and an active layer 106. The gate layer 101 is patterned to form gates and scan lines, the source/drain layer 102 is patterned to form active drains and data lines, and the pixel electrode layer 105 is patterned to form pixel electrodes. As shown in FIG. 2, in the four-domain design, directions of the liquid crystals are based on the design of the pixel electrode so that directions of liquid crystals 110 are 45 degrees, 135 degrees, 225 degrees, and 315 degrees respectively. When viewing the liquid crystal display device at large viewing angles, white areas due to the large viewing angles will appear and lead to the problem of color shifting at the large viewing angles. When the sub-pixels adopt an eight-domain design, it is necessary to introduce thin film transistors for control. Generally, three transistors are used for control, which will result in a lower aperture ratio of the liquid crystal display device. Therefore, existing vertical alignment type liquid crystal display devices have the technical problem of color shifting at large viewing angles.

Figure 3:
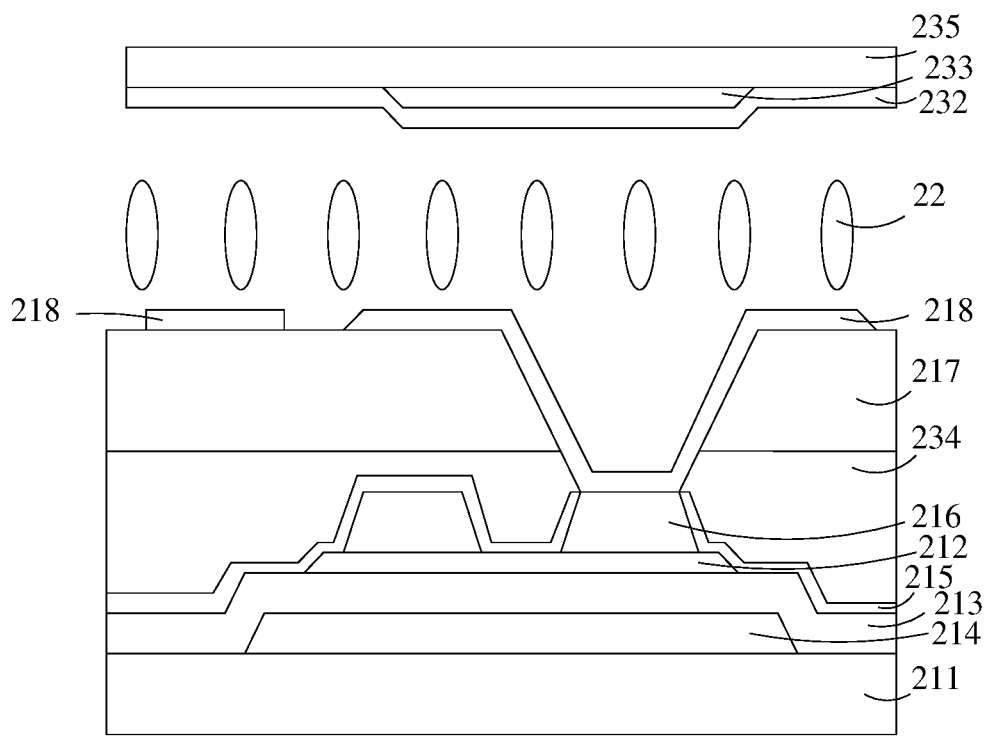
FIG. 3 is a first schematic diagram of a liquid crystal display panel provided by an embodiment of the application.
Figure 4:
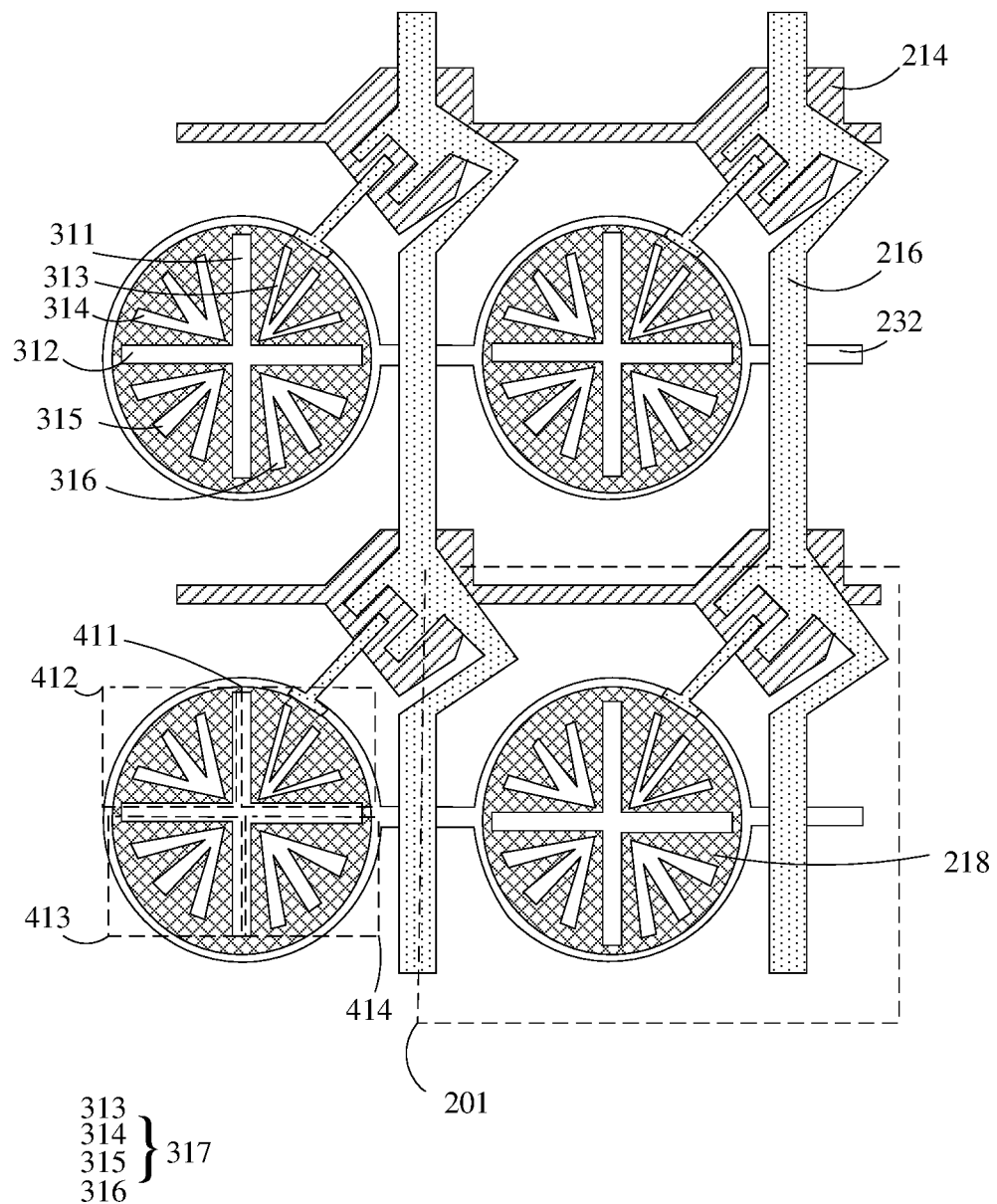
FIG. 4 is a second schematic diagram of a liquid crystal display panel provided by an embodiment of the application.

As shown in FIG. 3 and FIG. 4, an embodiment of the present application provides a liquid crystal display panel. The liquid crystal display panel comprises a plurality of sub-pixels 201. The sub-pixels 201 comprise pixel electrodes 218 and thin film transistors. The shape of the sub-pixels 201 includes a square, and the shape of the pixel electrode 218 includes a circle. The thin film transistor is arranged on each side of the square formed by the sub-pixel 201 and is connected to the pixel electrode 218 through a signal line.

Wherein, the pixel electrode 218 is divided by a plurality of slits to form a plurality of sub-pixel electrodes, and the plurality of slits include a first slit 311 and a second slit 312 that pass through a center of the pixel electrode 218 and are perpendicular to the first slit and a plurality of third slit 317. The first slit 311 and the second slit 312 divide the pixel electrode 218 into a first quadrant area 411, a second quadrant area 412, a third quadrant area 413, and a fourth quadrant area 414 that are arranged counterclockwise. The third slit 317 is evenly arranged in at least one of the first quadrant area 411, the second quadrant area 412, the third quadrant area 413, and the fourth quadrant area 414.

Embodiments of the present application provide a liquid crystal display panel, and the liquid crystal display panel comprises a plurality of sub-pixels, wherein each of the plurality of sub-pixels comprises a pixel electrode and a thin film transistor (TFT), a shape of the sub-pixels include a square, a shape of the pixel electrode is circular. The TFT is arranged on each side of the square formed by the sub-pixel and is connected to the pixel electrode through a signal line, wherein the pixel electrode is divided into a plurality of sub-pixel electrodes by a plurality of slits, and the plurality of slits comprise a first slit and a second slit that passes through the center of the pixel electrode and are perpendicular to each other and a plurality of third slits. The first slit and the second slit divide the pixel electrode into a first quadrant area, a second quadrant area, a third quadrant area, and a fourth quadrant area that are arranged counterclockwise, and the plurality of third slits are evenly arranged in at least one of the first quadrant area, the second quadrant area, the third quadrant area and the fourth quadrant area. By setting the shape of the sub-pixels to a square and the shape of the pixel electrode to a circle, the thin film transistor can be arranged on the sides of the square, so as to make full use of the space. The pixel electrode is divided into a plurality of sub-pixel electrodes through the first slit, the second slit, and the plurality of third slits, so that more than four domains exits in the sub-pixels, and a number of the direction of the liquid crystal is increased. When viewing at different viewing angles, a number of liquid crystals in a same direction decreases when viewing so that a brightness of the liquid crystal display panel is reduced, thereby alleviating the color-shift problem and resolving the technical problem of color-shift at wide viewing angles in existing vertical alignment type liquid crystal display devices.

It should be noted that the thin film transistors are not shown in FIG. 4, and each of the thin film transistors comprise a gate, a source, a drain, an active layer, an insulating layer, and also a scan line and a data line.

It should be noted that the first slit 311 and the second slit 312 vertically divide the pixel electrode into a plurality of sub-pixel electrodes, and the third slit 317 divides the pixel electrode into a plurality of sub-pixel electrodes. Since the first slit and the second slit divide the pixel electrode into four sub-pixel electrodes, and the third slit further divides the sub-pixel electrodes in each quadrant area defined by the first slit and the second slit, a number of sub-pixel electrodes formed by dividing the pixel electrode by the first slit, the second slit, and the the third slit must be greater than 4, so that the number of domains of the sub-pixels is greater than 4, thereby increasing the number of directions of the liquid crystals.

In one embodiment, as shown in FIG. 4, the third slit 317 comprises a fourth slit 313 and a fifth slit 315, and the fourth slit 313 is located in the first quadrant area 411, so the fifth slit 315 is located in the third quadrant area 413, and center lines of the fourth slit 313 and the the fifth slit 315 are on a same straight line and pass through an overlapping area. The fourth slit 313 and the fifth slit 315 are not in contact with the overlapping area. The fourth slit and the fifth slit are formed in the first quadrant area and the third quadrant area respectively, so that when viewing in a direction from the first quadrant area to the third quadrant area or in a direction from the third quadrant area to the first quadrant area, due to the increased number of liquid crystal directions compares with the conventionally smaller number of liquid crystal directions, a brightness in these directions can be dispersed, thereby alleviating color shifting and increasing the viewing angles of the liquid crystal display panel.

In one embodiment, the fourth slit and the fifth slit respectively comprise a slit. The fourth slit divides the pixel electrode in the first quadrant area into two sub-pixel electrodes, and the fifth slit divides the pixel electrode in the third quadrant area into two sub-pixel electrodes. Each of the fourth slit and the fifth slit can comprise only one slit when providing the third slit to divide the pixel electrode of each quadrant area into two equally divided sub-pixel electrodes, thereby increasing the number of directions of liquid crystals in in the first quadrant area and the third quadrant area and alleviating color shifting at the viewing angle of the liquid crystal display panel in the directions of the first quadrant area and the third quadrant area.

In one embodiment, as shown in FIG. 4, the fourth slit 313 and the fifth slit 315 respectively comprise three slits, the fourth slit 313 divides the pixel electrode 218 in the first quadrant area 411 into four sub-pixel electrodes, and the fifth slit 315 divides the pixel electrode 218 in the third quadrant area 413 into four sub-pixel electrodes. When the fourth slit divides the pixel electrodes in the first quadrant area into a plurality of sub-pixel electrodes and the fifth slit divides the pixel electrodes in the third quadrant area into a plurality of sub-pixel electrodes, the fourth slit and the fifth slit can divide the sub-pixel electrodes in the first quadrant area and the third quadrant area into four equal sub-pixel electrodes and further into eight equal sub-pixel electrodes. That is, the pixel electrode is divided into sub-pixel electrodes to ensure that the sub-pixel electrodes are equally divided. The pixel electrodes can be divided into various numbers of sub-pixel electrodes, so that the sub-pixels of each domain are obtained correspondingly, the number of liquid crystal directions is correspondingly increased, and the ability to alleviate color shifting is correspondingly increased. Therefore, the viewing angles of the liquid crystal display panel is improved, and the technical problem of color shifting at large viewing angles with existing vertical alignment type liquid crystal display devices is reduced.

In one embodiment, as shown in FIG. 4, the third slit 317 further comprises a sixth slit 314 and a seventh slit 316, the sixth slit 314 is located in the second quadrant area 412, and the first seventh slit 316 is located in the fourth quadrant area 414. Center lines of the sixth slit 314 and the seventh slit 316 are on a same straight line and pass through an overlapping area, and the sixth slit 314 and the seven slit 316 are not in contact with the overlapping area. The sixth slit and the seventh slit are formed in the second quadrant area and the fourth quadrant area respectively when forming the third slit. The sixth slit and the seventh slit divides the pixel electrodes in the second quadrant area and the fourth quadrant area into a plurality of sub-pixel electrodes. Due to the existence of the plurality of the slits, when viewing in the direction of the fourth quadrant area to the fourth quadrant area or the direction from the fourth quadrant area to the second quadrant area, due to the increased number of liquid crystal directions compared with the conventionally smaller number of liquid crystal directions, the brightness of the direction can be dispersed, thereby alleviating color shifting and increasing the viewing angles of the liquid crystal display panel.

In one embodiment, the sixth slit and the seventh slit respectively comprise a slit, the sixth slit divides the pixel electrode in the second quadrant area into two sub-pixel electrodes, and the seventh slit divides the pixel electrode in the fourth quadrant area into two sub-pixel electrodes. Each of the sixth slit and the seventh slit can comprise only one slit when dividing the pixel electrode of the second quadrant area and the fourth quadrant area into two equally divided sub-pixel electrodes, thereby increasing the number of directions of liquid crystals in in the first quadrant area and the third quadrant area and alleviating the color shifting at the viewing angles of existing liquid crystal display panels.

In one embodiment, as shown in FIG. 4, the sixth slit 314 and the seventh slit 316 respectively comprise three slits, and the sixth slit 314 divides the pixel electrode 218 in the second quadrant area 412 into four sub-pixel electrodes, and the seventh slit 316 divides the pixel electrode 218 in the fourth quadrant area 414 into four sub-pixel electrodes. When the sixth slit and the seventh slit divide the pixel electrodes in the second quadrant area and the fourth quadrant area into a plurality of sub-pixel electrodes, the pixel electrodes in each quadrant area can be divided into 4 equal parts and 8 equal parts. The pixel electrode can be divided into various numbers of sub-pixel electrodes, so that the sub-pixels of each domain are obtained correspondingly, and the number of liquid crystal directions is correspondingly increased, thereby correspondingly increasing the ability to alleviate color shifting, increasing the viewing angles of liquid crystal display panels and reducing the technical problem of color shifting at large viewing angles with existing vertical alignment type liquid crystal display devices.

In one embodiment, the third slit comprises a fourth slit and a fifth slit, the fourth slit is located in the first quadrant area, the fifth slit is located in the third quadrant area, and an overlapping area formed by the fourth slit and the fifth slit is the same as the overlapping area formed by the first slit and the second slit. When forming the fourth and fifth slits, the fourth and fifth slits can also be formed into an overlapping area, thereby increasing the aperture ratio, and the overlapping area formed by the fourth and fifth slits and the overlapping area formed by the first and second slits are the same, so that the pixel electrodes in each quadrant area are equally divided.

In one embodiment, the third slit further comprises a sixth slit and a seventh slit, the sixth slit is located in the second quadrant area, the first seventh slit is located in the fourth quadrant area, and an overlapping area formed by the sixth slit and the seventh slit is the same as the overlapping area formed by the first slit and the second slit. When forming the sixth and seventh slits, the sixth and seventh slits can also be formed into an overlapping area, thereby increasing the aperture ratio, and the overlapping area formed by the sixth and seventh slits and the overlapping area formed by the first and second slits are the same, so that the pixel electrodes in each quadrant area are equally divided.

In one embodiment, each one of the slits of the first slit, the second slit, the fourth slit, the fifth slit, the sixth slit, and the seventh slit have the same length and the same width. When forming each slit, the length and width of each slit are made equal, so that the number of liquid crystals in the slits in each direction is consistent, so as to avoid different display brightness due to different number of liquid crystal, thereby alleviating color shifting.

In one embodiment, a distance between the first slit and the edge of a circle formed by the pixel electrode is equal to one-tenth to one-fifth of a diameter of the pixel electrode. When designing the first slit, in order to increase the aperture ratio, the length of the first slit should be as great as possible. However, considering that the part connected to the edge of the pixel electrode is narrow, there will be a problem of fracture, resulting in an absence of signals between each sub-pixel electrode of the pixel electrode. Therefore, the connected part of the edge of the pixel electrode should have a predetermined width, so that the first slit is at a predetermined distance from the edge of the pixel electrode. For example, a minimum distance between one end of the first slit can be set at one-tenth to one-fifth of a diameter of the pixel electrode, thereby making for a greater aperture ratio. At the same time, the connecting part of the edge of the pixel electrode has a predetermined width, so that the aperture ratio of the liquid crystal display panel is increased when the liquid crystal display panel is working normally.

In one embodiment, as shown in FIG. 4, the thin film transistor comprises a data line 216 and a scan line 214, and the data line 216 and the scan line 214 are arranged on the edges of the square formed by the sub-pixel 201. A distance between the pixel electrode 218 and the scan line 214 is equal to a line width of the scan line 214. When forming the sub-pixels, the data lines and scan lines are arranged on edges of the sub-pixels, so that the scan line and data line are formed on the edges of the sub-pixel to make full use of the space of the sub-pixel when the pixel electrode of a circle is formed. At the same time, the distance between the scan line and the pixel electrode can be made as small as possible in order to increase the aperture ratio, but the scan line and the pixel electrode are separated by a certain distance in order to avoid parasitic capacitance between each line, so that the distance between the pixel electrode and the scan line is equal to the line width of the scan line, so as to maximize the aperture ratio and allow the LCD panel to work normally.

In one embodiment, as shown in FIGS. 3 and 4, the liquid crystal display panel further comprises a common electrode layer 232 and a substrate 211, and the projection of the common electrode layer 232 on the substrate 211 surrounds where the pixel electrode 218 is arranged, and the common electrode layer 232 in the adjacent sub-pixels 201 is connected through the common electrode wiring. When designing the common electrode layer, the common electrode layer can also be designed to be circular and further connected to the common electrode layer through the common electrode wiring, so that the signals of the common electrode layer are the same.

In one embodiment, as shown in FIG. 3, the liquid crystal display panel comprises a color on array (a color film layer that is arranged on an array side, COA) substrate, a first substrate, and a liquid crystal layer 22 between the COA substrate and the first substrate. The COA substrate comprises a substrate 211, a gate layer 214, a gate insulating layer 213, an active layer 212, an interlayer insulating layer 215, a source/drain layer 216, a color resist layer 234, a planarization layer 217, and a pixel electrode layer 218. The first substrate comprises a common electrode layer 232, a black matrix layer 233, and a substrate 235. The gate layer is patterned with gates and scan lines, the source/drain layer is patterned with the active drain electrode and the data line, and the pixel electrode layer is patterned to form the pixel electrodes.

Figure 5:
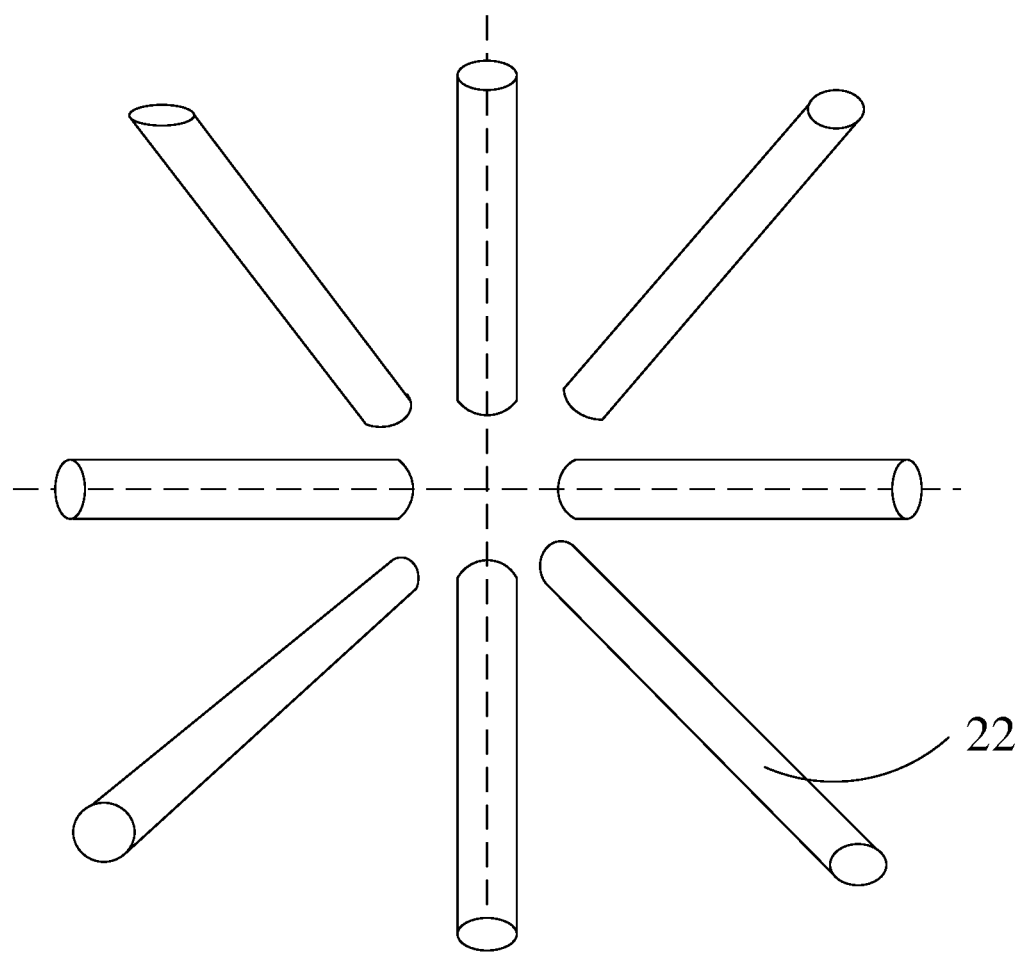
FIG. 5 is a schematic diagram of the arrangement direction of liquid crystals in a liquid crystal display panel provided by an embodiment of the application.

As shown in FIGS. 2 and 5, when comparing directions of the liquid crystals in the existing liquid crystal display panel with directions of the liquid crystal display panel in an embodiment of the present application, it can be seen that directions of the liquid crystal layer 22 in the embodiment of the present application comprise vertical directions, horizontal directions, and oblique directions. Taking a 45-degree viewing angle of a liquid crystal display panel as an example, since the liquid crystal directions are 45 degrees, 135 degrees, 225 degrees, and 315 degrees in existing liquid crystal display panels, a large number of liquid crystals are arranged at 45 degrees and 225 degrees when viewing at 45 degrees, resulting in greater brightness and color shifting. However, in the liquid crystal display panel in the embodiments of the present application, the liquid crystals are dispersed to vertical directions, horizontal directions, and 45 degree-angle directions when viewing the liquid crystal display panel at a 45 degree angle, thereby resulting in reduced brightness and, in turn, less color shifting.

Figure 6:
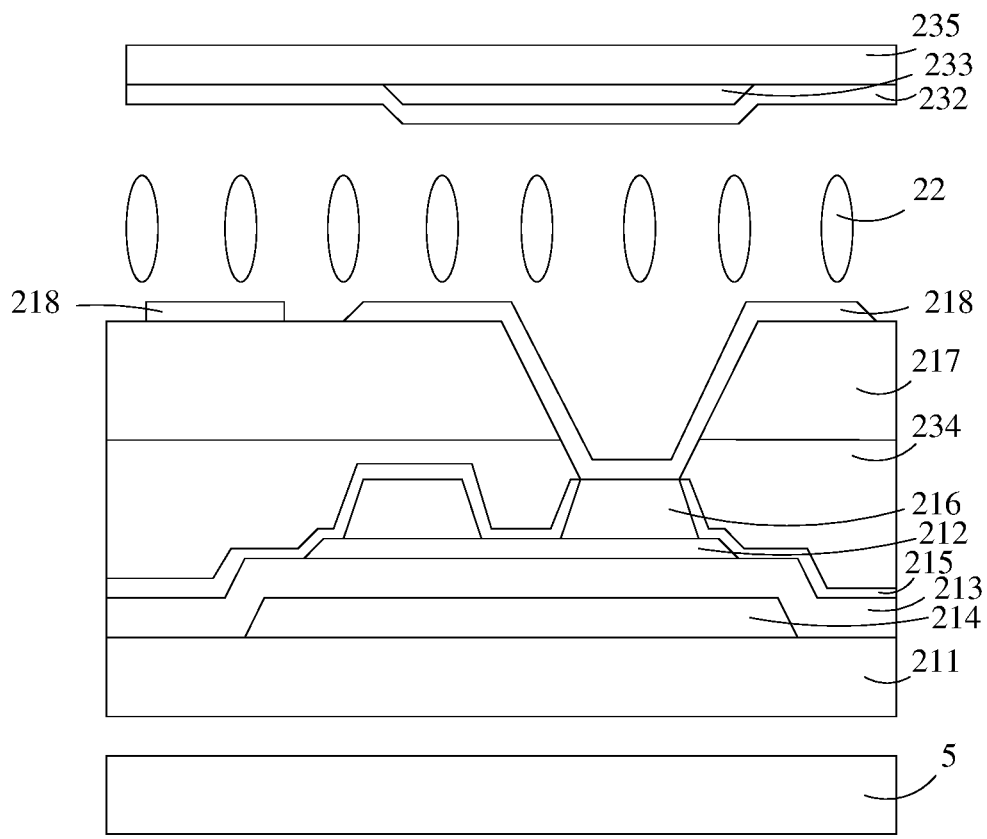
FIG. 6 is a schematic diagram of a liquid crystal display device provided by an embodiment of the application.

As shown in FIG. 4 and FIG. 6, an embodiment of the present application provides a liquid crystal display device. The liquid crystal display device comprises a liquid crystal display panel and a backlight module 5. The liquid crystal display panel comprises a plurality of sub-pixels 201. The sub-pixel 201 comprises a pixel electrode 218 and a thin film transistor, a shape of the sub-pixel 201 includes a square and a shape of the pixel electrode 218 includes a circle. The thin film transistor is arranged on each edge of the square formed by the sub-pixel 201 and is connected to the pixel electrode 218 through a signal line Wherein, the pixel electrode 218 is divided by a plurality of slits to form a plurality of sub-pixel electrodes, and the plurality of slits comprise a first slit 311 and a second slit 312 that pass through the center of the pixel electrode 218 and are perpendicular to each other and a third slit 317. The first slit 311 and the second slit 312 divide the pixel electrode 218 into a first quadrant area 411, a second quadrant area 412, a third quadrant area 413, and a fourth quadrant area 414 that are arranged counterclockwise. The third slit 317 is evenly arranged in at least one of the first quadrant area 411, the second quadrant area 412, the third quadrant area 413, and the fourth quadrant area 414.

Embodiments of the present application provide a liquid crystal display device. The liquid crystal display device comprises a liquid crystal display panel and a backlight module, and the liquid crystal display device comprises a plurality of sub-pixels, wherein each of the plurality of sub-pixels comprises a pixel electrode and a thin film transistor (TFT). A shape of the sub-pixel includes a square, and a shape of the pixel electrode includes a circle. The TFT is arranged on each side of the square formed by the sub-pixel and is connected to the pixel electrode through a signal line, wherein the pixel electrode is divided into a plurality of sub-pixel electrodes by slits, and the slits comprise a first slit, a second slit that pass through the center of the pixel electrode and are perpendicular to the first slit and a plurality of third slits; The first slit and the second slit divide the pixel electrode into a first quadrant area, a second quadrant area, a third quadrant area, and a fourth quadrant area that are arranged counterclockwise, and the plurality of third slits are evenly arranged in at least one of the first quadrant area, the second quadrant area, the third quadrant area, and the fourth quadrant area. By setting the shape of the sub-pixels to a square and the shape of the pixel electrode to a circle, the thin film transistor can be arranged on the sides of the square, so as to make full use of the space. The pixel electrode is divided into a plurality of sub-pixel electrodes through the first slit, the second slit, and the plurality of third slits, so that more than four domains exits in the sub-pixels, and the number of the direction of the liquid crystals is increased. When viewing at different viewing angles, the number of liquid crystals in the same direction decreases when viewing so that a brightness of the liquid crystal display panel is reduced, thereby alleviating the color-shift problem and resolving the technical problem of color-shift at large viewing angles in existing vertical alignment type liquid crystal display devices.

In one embodiments, in the liquid crystal display device, the plurality of third slits comprise a fourth slit and a fifth slit. The fourth slit is located in the first quadrant area, and the fifth slit is located in the third quadrant area. Center lines of the fourth slit and the fifth slit are on a same straight line and pass through an overlapping area, and the fourth slit and the fifth slit are not in contact with the overlapping area.

In one embodiment, in the liquid crystal display device, the fourth slit and the fifth slit respectively comprise a slit, the fourth slit divides the pixel electrode in the first quadrant area into two sub-pixel electrodes, and the fifth slit divides the pixel electrode in the third quadrant area into two sub-pixel electrodes.

In one embodiment, in the liquid crystal display device, the fourth slit and the fifth slit respectively comprise three slits, the fourth slit divides the pixel electrode in the first quadrant area into four sub-pixel electrodes, and the fifth slit divides the pixel electrode in the third quadrant area into four sub-pixel electrodes.

In some embodiments, in the liquid crystal display device, the plurality of third slits further comprise a sixth slit and a seventh slit, the sixth slit is located in the second quadrant area, and the seventh slit is located in the fourth quadrant area. Center lines of the sixth slit and the seventh slit are on a same straight line and pass through an overlapping area, and the sixth slit and the seven slit are not in contact with the overlapping area.

In some embodiments, in the liquid crystal display device, the sixth slit and the seventh slit respectively comprise a slit, the sixth slit divides the pixel electrode in the second quadrant area into two sub-pixel electrodes, and the seventh slit divides the pixel electrode in the fourth quadrant area into two sub-pixel electrodes.

In some embodiments, in the liquid crystal display device, the sixth slit and the seventh slit respectively comprise three slits, and the sixth slit divides the pixel electrode in the second quadrant area into four sub-pixel electrodes, and the seventh slit divides the pixel electrode in the fourth quadrant area into four sub-pixel electrodes.

In some embodiments, in the liquid crystal display device, the third slit comprises a fourth slit and a fifth slit, the fourth slit is located in the first quadrant area, and the fifth slit is located in the third quadrant area, An overlapping area formed by the fourth slit and the fifth slit is the same as the overlapping area formed by the first slit and the second slit.

In some embodiments, in the liquid crystal display device, the third slit further comprises a sixth slit and a seventh slit, the sixth slit is located in the second quadrant area, the seventh slit is located in the fourth quadrant area, and an overlapping area formed by the sixth slit and the seventh slit is the same as the overlapping area formed by the first slit and the second slit.

According to the above embodiments, it can be known that:

Embodiments of the present application provides a liquid crystal display panel and a liquid crystal display device, and the liquid crystal display panel comprises a plurality of sub-pixels, wherein each of the plurality of sub-pixels comprises a pixel electrode and a thin film transistor, a shape of the sub-pixel includes a square, and a shape of the pixel electrode includes a circle. The TFT is arranged on each side of the square formed by the sub-pixel and is connected to the pixel electrode through a signal line, wherein the pixel electrode is divided into a plurality of sub-pixel electrodes by a plurality of slits, and the plurality of slits comprise a first slit, a second slit that pass through the center of the pixel electrode and are perpendicular to the first slit, and a plurality of third slits. The first slit and the second slit divide the pixel electrode into a first quadrant area, a second quadrant area, a third quadrant area, and a fourth quadrant area that are arranged counterclockwise, and the plurality of third slits are evenly arranged in at least one of the first quadrant area, the second quadrant area, the third quadrant area, and the fourth quadrant area. By setting the shape of the sub-pixels to a square and the shape of the pixel electrode to a circle, the thin film transistor can be arranged on the sides of the square, so as to make full use of the space. The pixel electrode is divided into a plurality of sub-pixel electrodes through the first slit, the second slit, and the plurality of third slits, so that more than four domains exits in the sub-pixels, and the number of the direction of the liquid crystal is increased. When viewing at different viewing angles, the number of liquid crystals in the same direction decreases when viewing so that a brightness of the liquid crystal display panel is reduced, thereby alleviating the color-shift problem and alleviating the technical problem of color-shift at large viewing angle in existing vertical alignment type liquid crystal display devices.

Accordingly, although the present invention has been illustrated and described with respect to one or more implementations, equivalent alterations and modifications will occur to those skilled in the art based on a reading and understanding of the present disclosure and the accompanying drawings. The present invention comprises all such modifications and alterations and is limited only by the scope of the following claims.

What is claimed is:

1. A liquid crystal display panel, comprising a pixel electrode and a liquid crystal layer on the pixel electrode, wherein the pixel electrode is circular;

wherein the pixel electrode is divided into a plurality of sub-pixel electrodes by a plurality of slits, and the plurality of slits comprise a first slit and a second slit that pass through the center of the pixel electrode and are perpendicular to each other, and a plurality of third slits;

wherein the first slit and the second slit divide the pixel electrode into a first quadrant area, a second quadrant area, a third quadrant area, and a fourth quadrant area that are arranged counterclockwise, and one or more of the third slits are arranged in at least one of the first quadrant area, the second quadrant area, the third quadrant area and the fourth quadrant area, the plurality of third slits comprises a plurality of fourth slits located in the first quadrant area, the plurality of fourth slits extend in radial directions of the pixel electrode, each of the fourth slits has a first end and a second end, the first end is closer to the first slit and the second slit than the second end, first ends of the fourth slits are communicated with each other, and not communicated with the first slit and the second slit, and at least one fourth slit is located in a direction at an angle having an absolute value of 45 degrees or 135 degrees with respect to a horizontal direction, and liquid crystal molecules in the liquid crystal layer are, in response to a voltage applied to the pixel electrode, alignable along the radial direction at least in the horizontal direction, a vertical direction, and the direction at the angle having the absolute value of 45 degrees or 135 degrees.

2. The liquid crystal display panel of claim 1, wherein the plurality of third slits comprise a fifth slit, the fifth slit is located in the third quadrant area, center lines of the fourth slit and the fifth slit are on the same straight line and pass through an overlapping area, and the fourth slit and the fifth slit are not in contact with the overlapping area.

3. The liquid crystal display panel of claim 2, wherein the fourth slit and the fifth slit respectively comprise three slits, the fourth slit divides the pixel electrode in the first quadrant area into four sub-pixel electrodes, and the fifth slit divides the pixel electrode in the third quadrant area into four sub-pixel electrodes.

4. The liquid crystal display panel of claim 1, wherein the third slits comprise a fifth slit, the fourth slit is located in the first quadrant area, the fifth slit is located in the third quadrant area, and an overlapping area formed by the fourth slit and the fifth slit is the same as the overlapping area formed by the first slit and the second slit.

5. The liquid crystal display panel of claim 4, wherein the third slits further comprise a sixth slit and a seventh slit, the sixth slit is located in the second quadrant area, the seventh slit is located in the fourth quadrant area, and an overlapping area formed by the sixth slit and the seventh slit is the same as the overlapping area formed by the first slit and the second slit.

6. The liquid crystal display panel of claim 5, wherein the first slit, the second slit, the fourth slit, the fifth slit, the sixth slit, and the seventh slit have a same length and a same width.

7. The liquid crystal display panel of claim 6, wherein a distance between the first slit and an edge of a circle formed by the pixel electrode is equal to one-tenth to one-fifth of a diameter of the pixel electrode.

8. A liquid crystal display device comprising a liquid crystal display panel, a liquid crystal layer on the pixel electrode and a backlight module, wherein the liquid crystal display panel comprises a pixel electrode, the pixel electrode is circular;

wherein the pixel electrode is divided into a plurality of sub-pixel electrodes by a plurality of slits, and the plurality of slits comprise a first slit and a second slit that pass through the center of the pixel electrode and are perpendicular to each other, and a plurality of third slits;

wherein the first slit and the second slit divide the pixel electrode into a first quadrant area, a second quadrant area, a third quadrant area, and a fourth quadrant area that are arranged counterclockwise, and one or more of the third slits are arranged in at least one of the first quadrant area, the second quadrant area, the third quadrant area, and the fourth quadrant area, the plurality of third slits comprises a plurality of fourth slits located in the first quadrant area, the plurality of fourth slits extend in radial directions of the pixel electrode, each of the fourth slits has a first end and a second end, the first end is closer to the first slit and the second slit than the second end, first ends of the fourth slits are communicated with each other, and not communicated with the first slit and the second slit, and at least one fourth slit is located in a direction at an angle having an absolute value of 45 degrees or 135 degrees with respect to a horizontal direction, and liquid crystal molecules in the liquid crystal layer are, in response to a voltage applied to the pixel electrode, alignable along a radial direction of the pixel electrode and at least in a horizontal direction, a vertical direction, and a direction at an angle having an absolute value of 45 degrees or 135 degrees with respect to the horizontal direction.

9. The liquid crystal display device of claim 8, wherein the plurality of third slits comprise a fifth slit, the fifth slit is located in the third quadrant area, center lines of the fourth slit and the fifth slit are on a same straight line and pass through an overlapping area, and the fourth slit and the fifth slit are not in contact with the overlapping area.

10. The liquid crystal display device of claim 9, wherein the fourth slit and the fifth slit respectively comprise three slits, the fourth slit divides the pixel electrode in the first quadrant area into four sub-pixel electrodes, and the fifth slit divides the pixel electrode in the third quadrant area into four sub-pixel electrodes.

11. The liquid crystal display device of claim 8, wherein the third slits comprise a fifth slit, the fourth slit is located in the first quadrant area, the fifth slit is located in the third quadrant area, and an overlapping area formed by the fourth slit and the fifth slit is the same as the overlapping area formed by the first slit and the second slit.

12. The liquid crystal display device of claim 11, wherein the third slits further comprise a sixth slit and a seventh slit, the sixth slit is located in the second quadrant area, the seventh slit is located in the fourth quadrant area, and an overlapping area formed by the sixth slit and the seventh slit is the same as the overlapping area formed by the first slit and the second slit.

13. The liquid crystal display panel of claim 1, wherein the liquid crystal display panel further comprises a thin film transistor, a plurality of data lines and a plurality of scan lines, the data lines and the scan lines intersect with each other and define a plurality of sub-pixels, and the thin film transistor is located on a corner of one of the sub-pixels at an intersection of one of the data lines and one of the scan lines.

14. The liquid crystal display panel of claim 1, wherein the liquid crystal display panel further comprises a common electrode layer and a substrate, and a projection of the common electrode layer on the substrate surrounds the pixel electrode.

15. The liquid crystal display panel of claim 14, wherein the common electrode layer comprises a plurality of common electrodes, a projection of the common electrode on the substrate surrounds the pixel electrode, and the liquid crystal display panel further comprises a plurality of common electrode wirings, two common electrodes in adjacent sub-pixels are connected through one of the common electrode wirings.

16. The liquid crystal display panel of claim 1, wherein the plurality of third slits further comprises a plurality of sixth slits located in the second quadrant area, the plurality of sixth slits extend in radial directions of the pixel electrode, each of the sixth slits has a third end and a fourth end, the third end is closer to the first slit and the second slit than the fourth end, third ends of the sixth slits are communicated with each other, and not communicated with the first slit and the second slit.

17. The liquid crystal display panel of claim 16, wherein the plurality of third slits further comprises a plurality of seventh slits, the sixth slit and the seventh slit respectively comprises a slit, the sixth slit divides the pixel electrode in the second quadrant area into two sub-pixel electrodes, and the seventh slit divides the pixel electrode in the fourth quadrant area into two sub-pixel electrodes.

18. The liquid crystal display panel of claim 16, wherein the plurality of third slits further comprises a plurality of seventh slits, the sixth slit and the seventh slit respectively comprise three slits, the sixth slit divides the pixel electrode in the second quadrant area into four sub-pixel electrodes, and the seventh slit divides the pixel electrode in the fourth quadrant area into four sub-pixel electrodes.

19. The liquid crystal display device of claim 8, wherein the liquid crystal display panel further comprises a thin film transistor, a plurality of data lines and a plurality of scan lines, the data lines and the scan lines intersect with each other and define a plurality of sub-pixels, and the thin film transistor is located on a corner of one of the sub-pixels at an intersection of one of the data lines and one of the scan lines.

20. The liquid crystal display device of claim 8, wherein the liquid crystal display panel further comprises a common electrode layer and a substrate, and a projection of the common electrode layer on the substrate surrounds the pixel electrode.

* * * * *